United States Patent [19]

Hughes et al.

[11] Patent Number: 5,081,406
[45] Date of Patent: Jan. 14, 1992

[54] PROXIMITY RESPONSIVE CAPACITANCE SENSITIVE METHOD, SYSTEM, AND ASSOCIATED ELECTRICAL CIRCUITRY FOR USE IN CONTROLLING MECHANICAL AND ELECTRO-MECHANICAL EQUIPMENT

[75] Inventors: Rickey D. Hughes, Providence; James T. Reese, Logan, both of Utah

[73] Assignee: Saf-T-Margin, Inc., Id.

[21] Appl. No.: 543,466

[22] Filed: Jun. 26, 1990

[51] Int. Cl.⁵ .............................. G08B 13/26
[52] U.S. Cl. .................... 318/478; 340/562
[58] Field of Search ............ 318/16, 478, 558; 307/116, 129; 361/179, 181, 191, 203; 340/561, 562, 563

[56] References Cited

U.S. PATENT DOCUMENTS

| | | | |
|---|---|---|---|
| 3,100,879 | 8/1963 | Greunke | 340/562 X |
| 3,333,160 | 7/1967 | Gorski | 361/181 |
| 3,406,802 | 10/1968 | Needham et al. | 340/562 X |
| 3,573,783 | 4/1971 | Fudaley | 340/561 |
| 3,829,850 | 8/1974 | Guetersloh | 340/563 X |
| 3,836,828 | 9/1974 | Siegel | 340/563 X |
| 3,942,601 | 3/1976 | Smith | 180/271 |
| 3,947,734 | 3/1976 | Fyler | 361/181 |
| 3,953,770 | 4/1976 | Hayashi | 361/179 |
| 4,831,279 | 5/1989 | Ingraham | 340/562 X |

Primary Examiner—Bentsu Ro
Attorney, Agent, or Firm—William J. Bethurum

[57] ABSTRACT

A method and system and associated circuitry for controlling and stopping the motion of dangerous moving parts such as power saw blades substantially instantaneously in response to body or human capacitance produced by an operator coming with a predetermined critical distance from the moving part. This method includes, and this system provides for, among other things, connecting an antenna to the moving part and then coupling a tunable circuit to the antenna so that the antenna provides a variable lumped capacitance parameter (dependent upon human body capacitance) within the tunable circuit. This lumped capacitance parameter is variable in response to body or human capacitance produced when an operator comes within a predetermined critical proximity to the moving part. This variation in lumped capacitance serves to tune the circuit at or near a point of resonance to thereby enable an RF signal to pass through the tunable circuit at a detectable level which is subsequently processed to activate safety equipment for controlling and stopping the motion of the moving part substantially instantaneously. This invention is also adaptable for use with non-dangerous mechanical apparatus such as automatic door openers, automatic robot equipment, and capacitance-sensitive lighting appliances, and the like. It is also adaptable for use on automobile safety equipment, such as the proximity sensing of persons approaching an automobile out of the normal line-of-sight vision angles of the driver.

8 Claims, 6 Drawing Sheets

PROXIMITY RESPONSIVE CAPACITANCE SENSITIVE METHOD, SYSTEM, AND ASSOCIATED ELECTRICAL CIRCUITRY FOR USE IN CONTROLLING MECHANICAL AND ELECTRO-MECHANICAL EQUIPMENT

TECHNICAL FIELD

This invention relates generally to capacitance sensitive and proximity responsive electro-mechanical systems and apparatus and more particularly to a body capacitance responsive system and method for protecting the operators of potentially dangerous equipment, such as electrical power saws.

BACKGROUND ART

In the past, certain types of electrical and electro-mechanical equipment have been provided with proximity detectors for controlling the movement of potentially injurious moving parts in response to the approach of a portion of a human body such as a hand or arm. An example of such a proximity detector is disclosed in U.S. Pat. No. 4,453,112 issued to Saver et al, and this proximity detector is operative to stop the motion of automatic automobile windows in response to human body capacitance reaching a predetermined critical distance from a moving window glass. U.S. Pat. No. 4,453,112 is incorporated herein by reference.

However, as presently known, hazardous electrical equipment requiring the presence of an operator in relatively close proximity to potentially dangerous moving parts, such as saw blades, has not been equipped with protective devices for rapidly shutting down the equipment when the operator's hands or arms reach a critically dangerous distance from the moving parts. Where body capacitance-operated proximity sensitive devices have been utilized to control certain types of electrical and electro-mechanical equipment, problems have developed with the inability of these devices to discriminate between human body motion on the one hand and the motion of inanimate objects on the other hand. Thus, the desirability of providing a highly sensitive and discriminating proximity safety device and system for the protection of operators of dangerous equipment is manifest.

DISCLOSURE OF INVENTION

The general purpose and principal object of the present invention is to provide a highly sensitive and discriminating proximity system and method for use with certain types of electro-mechanical equipment, such as electrical power saws. This new and improved body or human capacitance responsive system and method utilizes certain novel circuitry described below which is readily adaptable for use with both fixed blade and movable blade power saw equipment. This object and purpose are accomplished by, among other things:

a. providing an antenna connected to a moving or movable part to be controlled, b. coupling a tuned circuit to the antenna so that the antenna provides a lumped capacitance parameter within the tuned circuit which is variable in response to an increase in body or human capacitance in close proximity to the antenna, c applying an RF signal to the tuned circuit, and d. varying the tuning of the circuit in response to a variation in the lumped capacitance produced by a human being coming within a predetermined critical distance from the moving or movable part.

In this manner, the tuning of the circuit to or near resonance at a certain known point on its transfer gain characteristic in response to a human being coming within a predetermined proximity of the moving or movable part allows a detectable level of RF signal to pass through the tuned circuit. This signal is then processed to in turn activate safety equipment for controlling the motion of the moving part substantially instantaneously.

Another object of this invention is to provide a new and improved method, system, and associated circuitry of the type described which is reliable in operation and readily adaptable for use with fixed blade and moving blade power saw equipment.

Another object of this invention is to provide a new and improved system of the type described which may be economically constructed using existing off-the-shelf electronic components which may be connected by those skilled in the art in a reliable circuit arrangement and variably tuned for different applications.

A further object of this invention is to provide a new and improved method and system of the type described which may be modified for use with various types of potentially dangerous electro-mechanical equipment wherein mechanically moving parts could possibly crush, cut, or otherwise injure a human being.

A further object of this invention is to provide a novel method and system of the type described which may be readily adapted to widely diverse applications such as the proximity sensing of persons entering within a predetermined range of automobile doors and the like. This type of operation could be used, for example, to alert the driver of an automobile of pedestrians entering in close proximity to the automobile and out of the line-of-sight of the driver.

A further object of this invention is to provide a new and improved method and system of the type described which may be modified for use and control of non-dangerous mechanical or electro-mechanical equipment such as door openers, home appliances, robotic equipment, automobile safety equipment and the like.

The above objects, features, and various advantages of this invention will become more fully apparent from the following description of the accompanying drawings.

DETAILED DESCRIPTION OF THE PREFERRED EMBODIMENT

Figure 1:
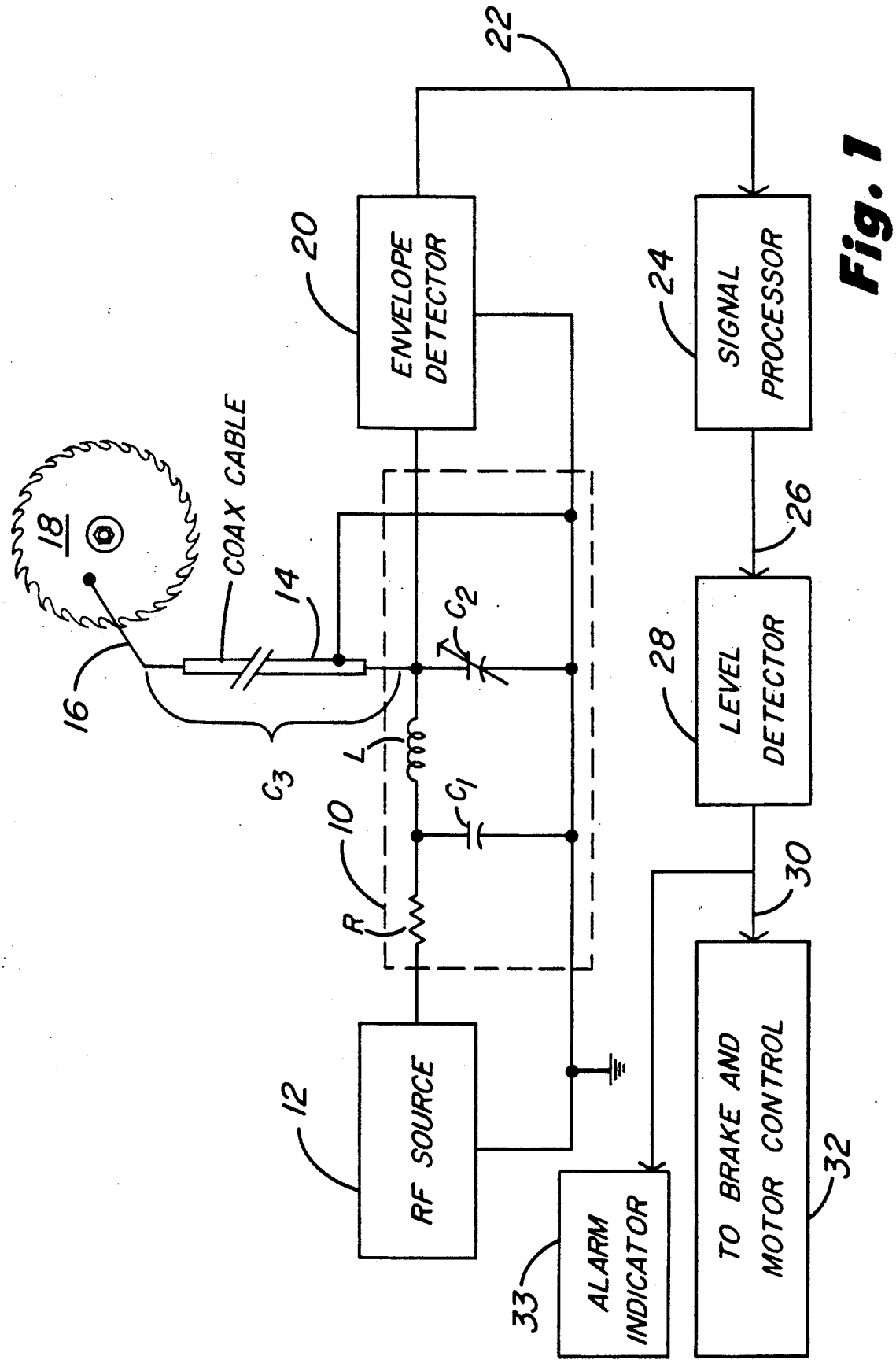
FIG. 1 is a hybrid functional block and schematic electrical diagram of a preferred embodiment for implementing the method and system described herein.

Referring now to FIG. 1, there is shown a band pass resistance-inductance-capacitance (RLC) tunable filter circuit 10 which is connected to receive a driving signal from an RF signal source 12 and is further connected as shown through a coaxial cable 14 and an antenna 16 to a saw blade 18. The connection of the coaxial cable 14 to the saw blade 16 may be made either by the use of a slip ring or by the use of parallel plate capacitance coupling using large parallel plates, preferably adjustable in separation distance. The RLC circuit 10 is a 3 pole pi network consisting of a resistance R, and inductance L, a fixed capacitor $C_1$ and a variable trimming capacitor $C_2$ connected in the manner indicated to an envelope detector stage 20. The trimming capacitor $C_2$ together with the shunt capacitance of the coaxial cable 14 and the capacitance of the antenna 16 form a lumped shunt capacitance indicated as $C_3$. As described below, this lumped shunt capacitance $C_3$ also includes and is controlled by the body capacitance of an operator coming within the electromagnetic field of the antenna 16. This body capacitance can be up to ten (10) times greater than wood or other inanimate objects coming within this electromagnetic field. Although the term "electromagnetic field" properly describes the physical coupling of body capacitance to the antenna 16, it is the electrical or "E-field" component of coupling to the parallel plate capacitance of the antenna 16 which has the predominant effect of changing the dynamic capacitance input to the antenna 16 and antenna coupling to the slope tuned network 10 which the present system responds in the manner described below to control shut-off of a saw blade motor or the like.

The envelope detector 20 has its output signal connected by way of line 22 to signal processing electronics 24 described in more detail below, and the output signal from the signal processing electronics stage 24 is connected by way of its output line 26 to a signal level detector stage 28. The output signal from the level detector stage 28 is connected by way of its output line 30 to break and motor control electronics 32 which are described in more detail below with reference to FIG. 2. The break and motor control electronics and the associated breaking mechanism (not shown) to which they are coupled are operative to stop the rotation of the saw blade 18 substantially instantaneously upon receipt of an output detection signal on line 30 from the level detector stage 28.

The trimming capacitor $C_2$ in the RLC circuit 10 is used to tune this band pass filter network slightly below its point of resonance, and the surface area of the antenna 16 must be sufficient to add the effect of "body capacitance", which is the capacitance added by the presence of the human body within the field of the antenna 16, to the lumped capacitance $C_3$. The RLC network 10 is thus alternatively referred to herein as a "slope" tuned network, since it is tuned on the slope of the transfer gain characteristic of this band pass filter network. The RLC network 10 component values are selected to make the transfer gain of the network highly critical to the value of $C_3$ and thus highly critical to small changes in the field capacitance of the antenna 16. The input resistor R in the RLC network 10 determines the overall linearity in shape of the frequency response curve of this RLC network 10, and larger values of R serve to steepen the slope of the transfer gain characteristic of this network as described below with reference to FIG. 3. Thus, by steepening the slope of this transfer gain characteristic, the network sensitivity to dynamic changes in $C_3$ is increased.

Figure 3:
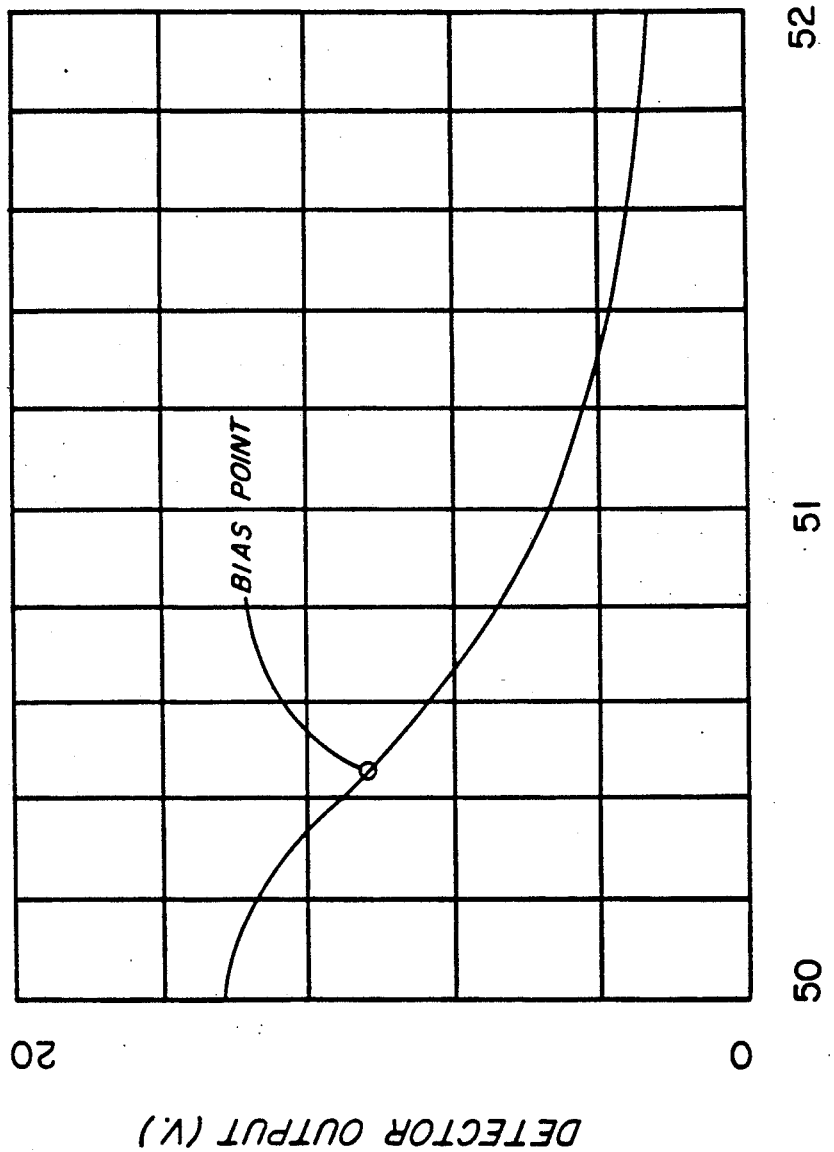
FIG. 3 is a graph showing the envelope detector output voltage in FIGS. 1 and 2 versus the equivalent antenna shunt capacitance in picofarads.

A careful analysis of the transfer function in FIG. 3 will show that a value of about 680 ohms for resistor R provides a good compromise between RLC network linearity and RLC network sensitivity. This value of resistor R has been used with an inductor L of four (4) microHenrys ($\mu H$), a first capacitor $C_1$ of 360 picofarads (pF) and a second capacitor $C_2$ of 50 picofarads in the actual reduction to practice of this invention.

The fixed capacitor $C_1$ serves to control the maximum transfer gain of the RLC filter network 10 at resonance, and has been selected to produce an arbitrary gain of seven (7). Higher gains may be achieved by increasing the value of $C_1$ and by retuning the trimming capacitor $C_2$. However, transfer gains greater than ten (10) can cause the RLC filter network 10 to be too sensitive and thus become unstable. The value of the inductor L is selected to resonate with the lumped capacitance $C_3$ slightly below the oscillation frequency of the RF source 12, thereby slope tuning the RLC network 10. The lumped capacitance $C_3$ thus becomes the RLC network parameter for effectively controlling the transfer gain of the network 10, since R, L, and C are fixed in value. Since the RF signal source 12 directly feeds the RLC network 10, the output signal from this network is an amplitude modulated carrier signal which varies in amplitude in response to body capacitance-produced dynamic changes in the capacitance dynamically coupled to the antenna 16.

Generally speaking, the changes in dynamic capacitance at the antenna 16 are proportional to changes which occur at parallel plate capacitors wherein the antenna 16 functions as one capacitor plate and the moving body part serves as the other capacitor plate. The amplitude of the dynamic capacitance signal coupled to the antenna 16 is proportional to A/d, where A is the effective parallel plate area and d is the effective parallel plate separation distance.

Figure 2:
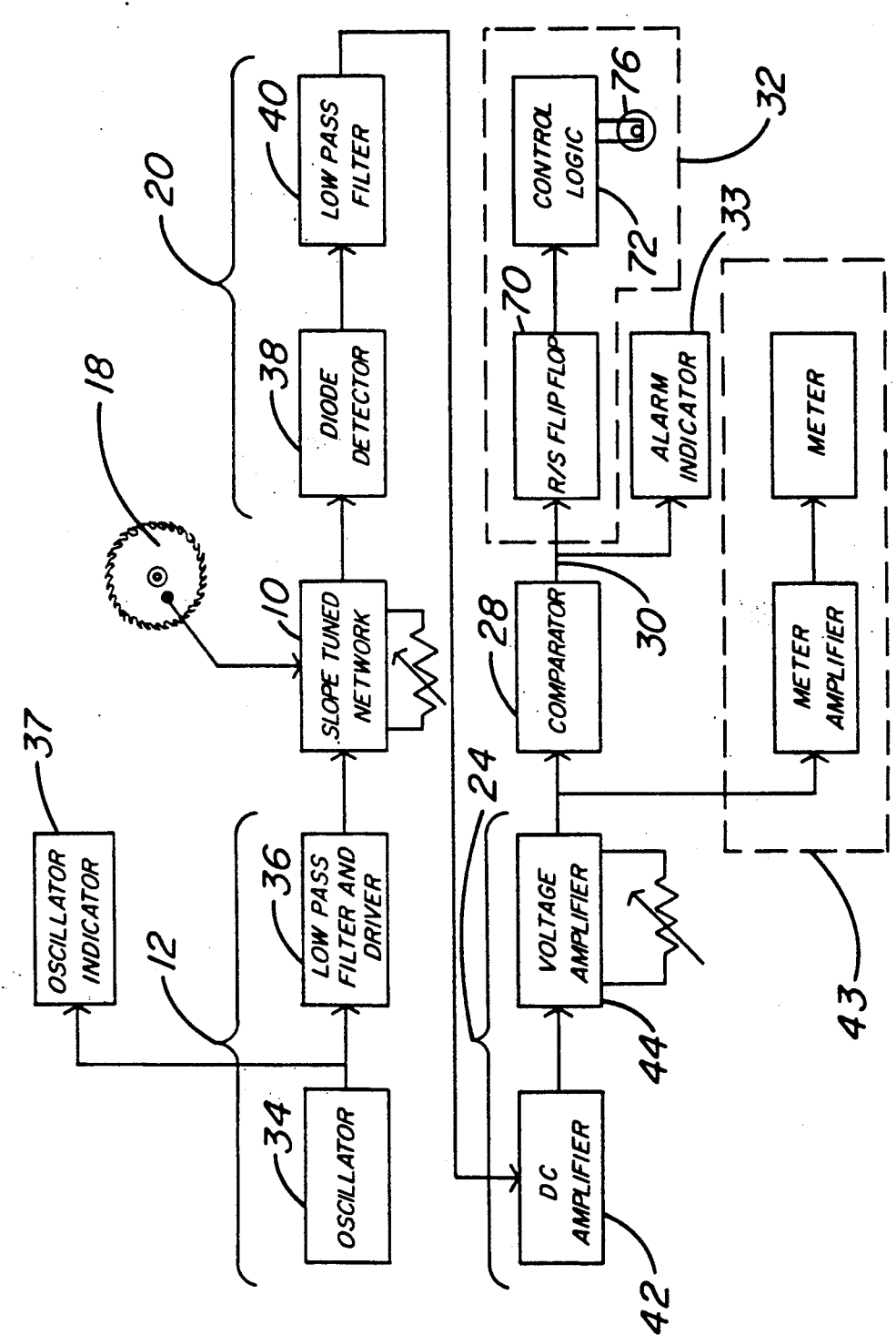
FIG. 2 is a functional block diagram of one implementation of the envelope detector, signal processor and level detector electronics shown in FIG. 1.

Referring now to both FIG. 1 and FIG. 2 wherein like reference numerals indicate identical electronic stages in these two figures, the RF signal source 12 consists of a crystal oscillator 34 and a low pass filter stage and a driver stage 36. The output signal from the driver stage 36 is applied directly to the slope tuned network 10, and the crystal oscillator within stage 34 will typically be tuned to generate a 12 mHz signal. The oscillator in stage 34 is slightly overdriven to generate peak clipping for improved amplitude and frequency stability, and unwanted harmonics are removed from the oscillator signal by the low pass filter connected thereto before being applied to the driver stage 36. The driver stage 36 will typically be a wide band amplifier having low signal distortion, a stable gain, and a sufficiently low output impedance necessary to handle the dynamic load of the RLC network 10. The exact oscillator frequency of the RF source 12 is not critical to the performance of the system and circuitry shown in FIGS. 1 through 6 herein. However, the Federal Communications Commission (FCC) does restrict the electric field intensity at a given distance from a radiating source, which in this instance is the antenna 16 and the saw blade 18 to which it is connected.

The envelope detector 20 is a typical AM detector stage consisting of a half-wave diode detector 38 and a low-pass filter 40 as shown in FIG. 2. The diode detector 38 rectifies the carrier signal applied thereto, and the low-pass filter 40 removes the carrier signal, leaving only the modulation components at its output connection 22. The low-pass filter 40 is typically a pi network of third order Butterworth filtering with an upper frequency cut-off of 10 kHz. The modulation components which pass through the low-pass filter 40 range from DC to a few hundred cycles, and the DC components of the detected envelope result from the "proximity effect" of non-moving objects which are placed near the sensor antenna 16. This effect can be reduced by limiting the low frequency response in the signal processing stage 24, thus allowing minor set-up changes on the power tool 18. Frequency components above DC result from motion of objects in the field of the antenna 16, and all of these components will be negative going with respect to increasing antenna capacitance. This is because the RLC network 10 is tuned on the lower slope of its transfer gain characteristic. The modulation components which are passed through the low-pass filter stage 40 must be positive going for positive level triggering, and as a result of this requirement an inverter stage (not shown) is required in the signal processing electronics 24.

The signal processor 24 includes a DC amplifier 42 and a voltage amplifier 44 of variable gain, and modulation components from the envelope detector 20 are processed in these two stages of gain 42 and 44. The DC amplifier 42 is a difference amplifier which is referenced to 6 volts DC and provides a 10 dB gain and the required signal inversion. By referencing the DC amplifier 42 to 6 volts, this allows a linear operation of the RLC network 10 and also provides an output signal therefrom which is referenced to zero volts DC. By correctly centering the lumped capacitance $C_2$ with respect to the point of resonance of the RLC circuit 10 and by optimum slope tuning of the RLC network 10, a zero DC offset voltage for the DC amplifier 42 may be obtained. Effects of various objects in the field of the antenna 16 can be determined by measuring the output voltage of the DC amplifier 42.

The second voltage amplifier stage 44 provides an adjustable signal gain up to 40 dB, thereby giving the proximity sensor according to the present invention a pick-up of range up to 12 inches for a human hand approaching the saw blade 18. The second stage 44 of voltage gain limits the low frequency response of the system to about 0.5 Hz, thereby reducing the "proximity effect" described above and allowing a fixed object to be placed near the antenna 16 without triggering the system operation. To maintain full sensitivity in the presence of an object being suddenly removed from the field of the antenna 16, the second stage 44 of voltage gain will track negative DC shifts in the system to thereby maintain an output positive voltage swing only with respect to zero volts DC.

The level detector 28, which is also alternatively identified herein as a comparator in FIG. 2, is a non-inverting operational amplifier using 0.5 volts of hystresis for noise immunity and for setting the trigger point of this detector at about 2.5 volts. The absolute discrimination of materials cannot be achieved through level detection, since the sensitivity of the RLC filter network 10 is also a function of distance of these materials from the antenna 16.

Referring now to FIG. 3, there is shown a graph of the envelope detector output voltage versus the equivalent antenna shunt capacitance in picofarads. This plot was obtained using the above stated values for the various components in the RLC network 10. The transfer gain corresponding to this detector output voltage peaked at about 7dB for a value of $C_3$ slightly greater than 50 picofarads and then began to taper off gradually as indicated to a gain of between 1 and 2 dB for a value of $C_3$ of about 52 picofarads. As an example, if the input signal to the slope tuned network 10 is ten (10) volts peak and the network 10 has a gain of eight (8), then a peak voltage of about eighty (80) volts may be chosen as the desired detectable output voltage from the following envelope detector stage 20 as threshold for producing sawblade shutdown in the manner described below. However, in the preferred mode of operation, as objects move into the field of the antenna 16, the network 10 is moved away from resonance, so this action in turn will produce a decrease in voltage output from the network 10. The reason for this is to establish an existing high level threshold voltage above which spurious signals cannot cause the system to function improperly.

The following TABLE A lists the effects of various materials on antenna 16 capacitance and provides a reference for the normalized modulation of human body capacitance versus modulation by the movement of inanimate objects within the field of the antenna 16.

TABLE A

Effects of Materials on Antenna Capacitance
Various materials were cut into 4 inch by 6 inch sections to approximate the dimensions of the human hand. All materials were .75 inches thick with the exception of the 6062 aluminum which was .062 inches thick. Each item was placed one inch from the sensing antenna (4 inch face dimension parallel to the antenna) while the shift in DC voltage at TP-1 (wideband test) was measured.

| Material | Volts | Normalized Modulation (%) |
|---|---|---|
| Human Hand | 5.5 | 100.0 |
| Common Woods | | |
| Alder | 0.38 | 6.9 |
| Oak | 0.38 | 6.9 |
| Particle Board | 0.31 | 5.6 |
| Pine | 0.34 | 6.2 |
| Redwood | 0.32 | 5.8 |
| Metals | | |
| Aluminum (6062 alloy) | 0.89 | 16.0 |
| Other Materials | | |
| Styrofoam | 0.02 | 0.36 |
| Plexiglass | 0.20 | 3.6 |

Figure 4:
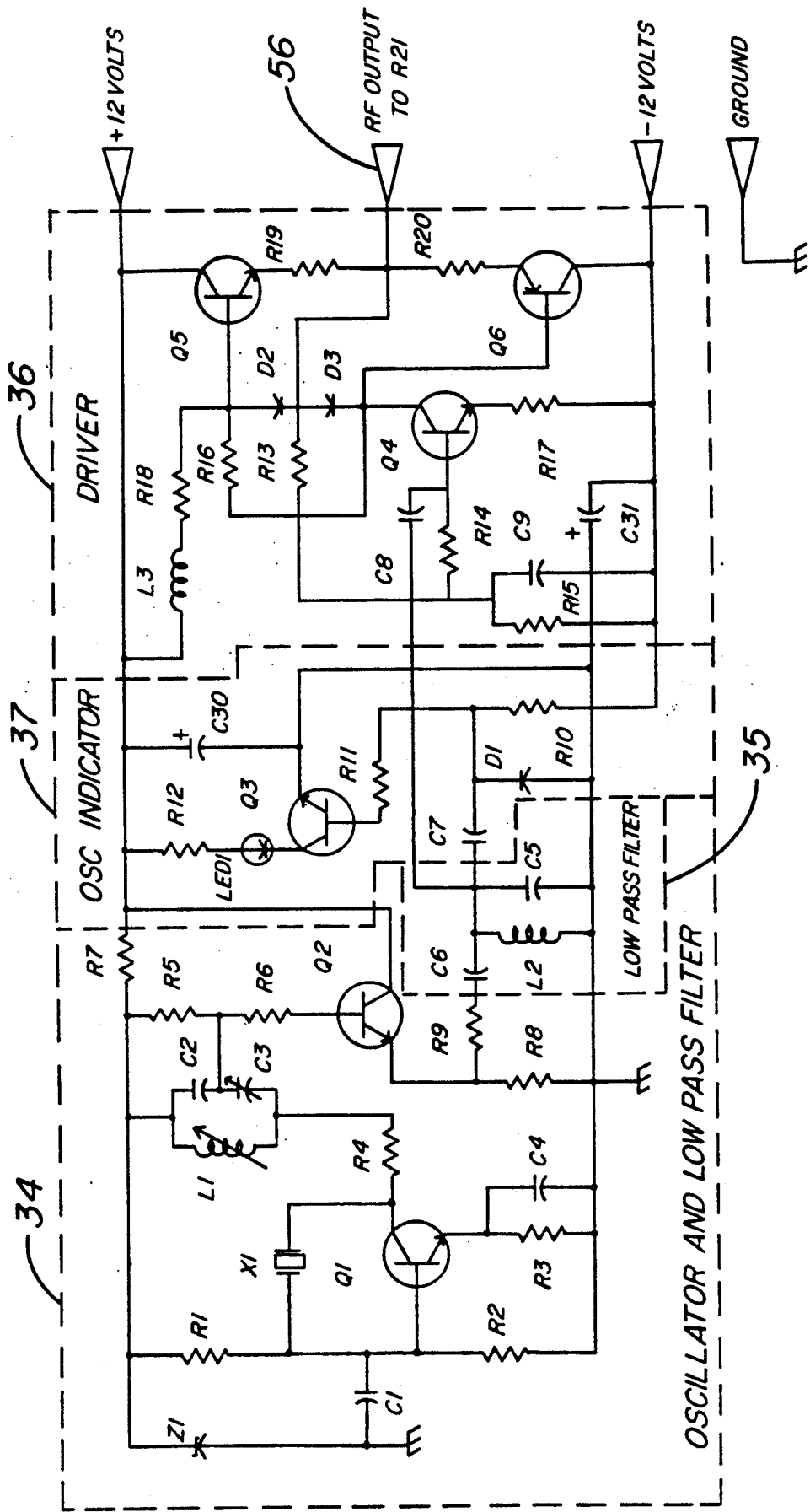
FIG. 4 is a schematic circuit diagram for the RF signal source shown functionally in FIGS. 1 and 2.
Figure 5:
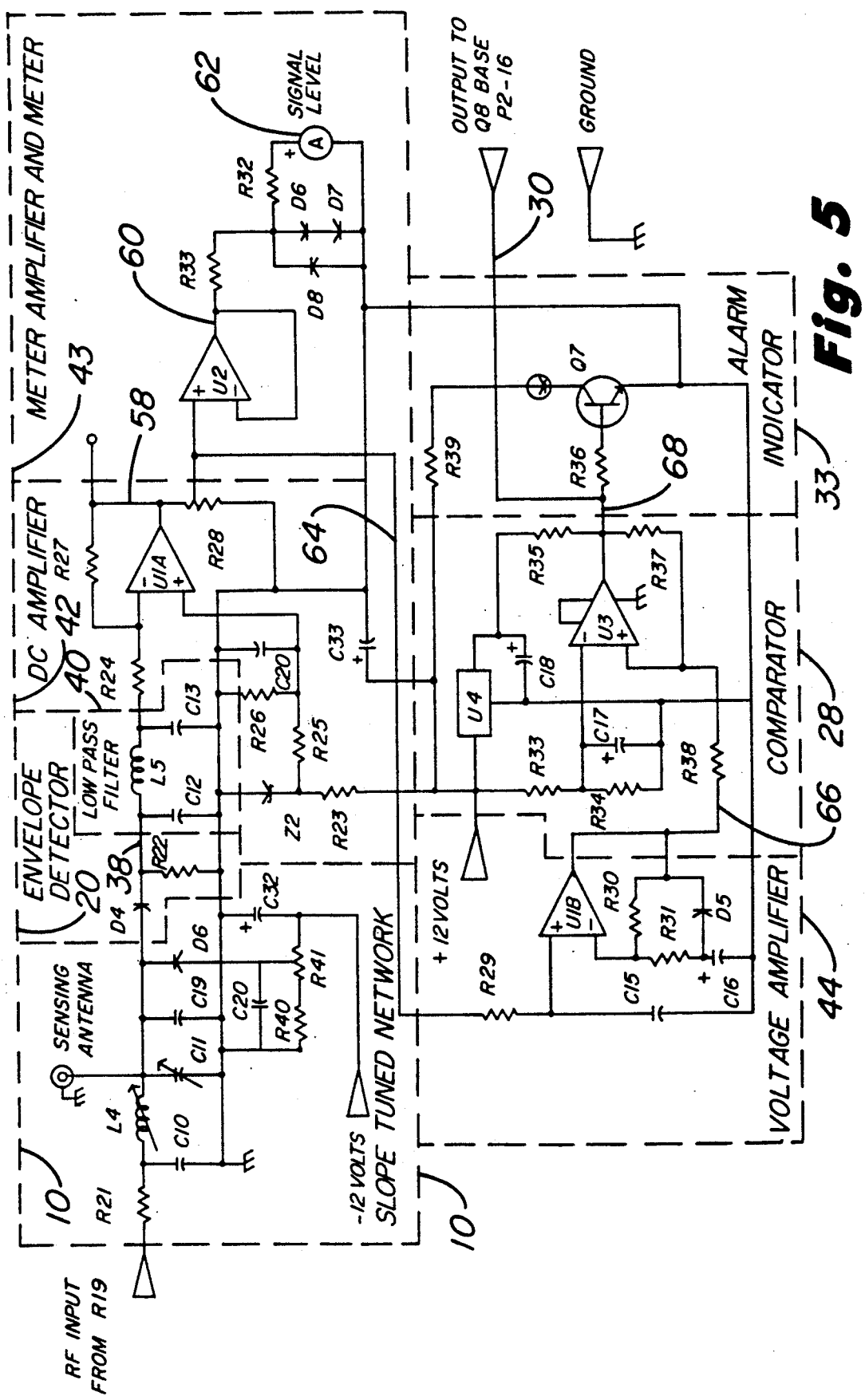
FIG. 5 is a schematic circuit diagram of part of the signal processing and level detection electronics shown functionally in FIGS. 1 and 2.
Figure 6:
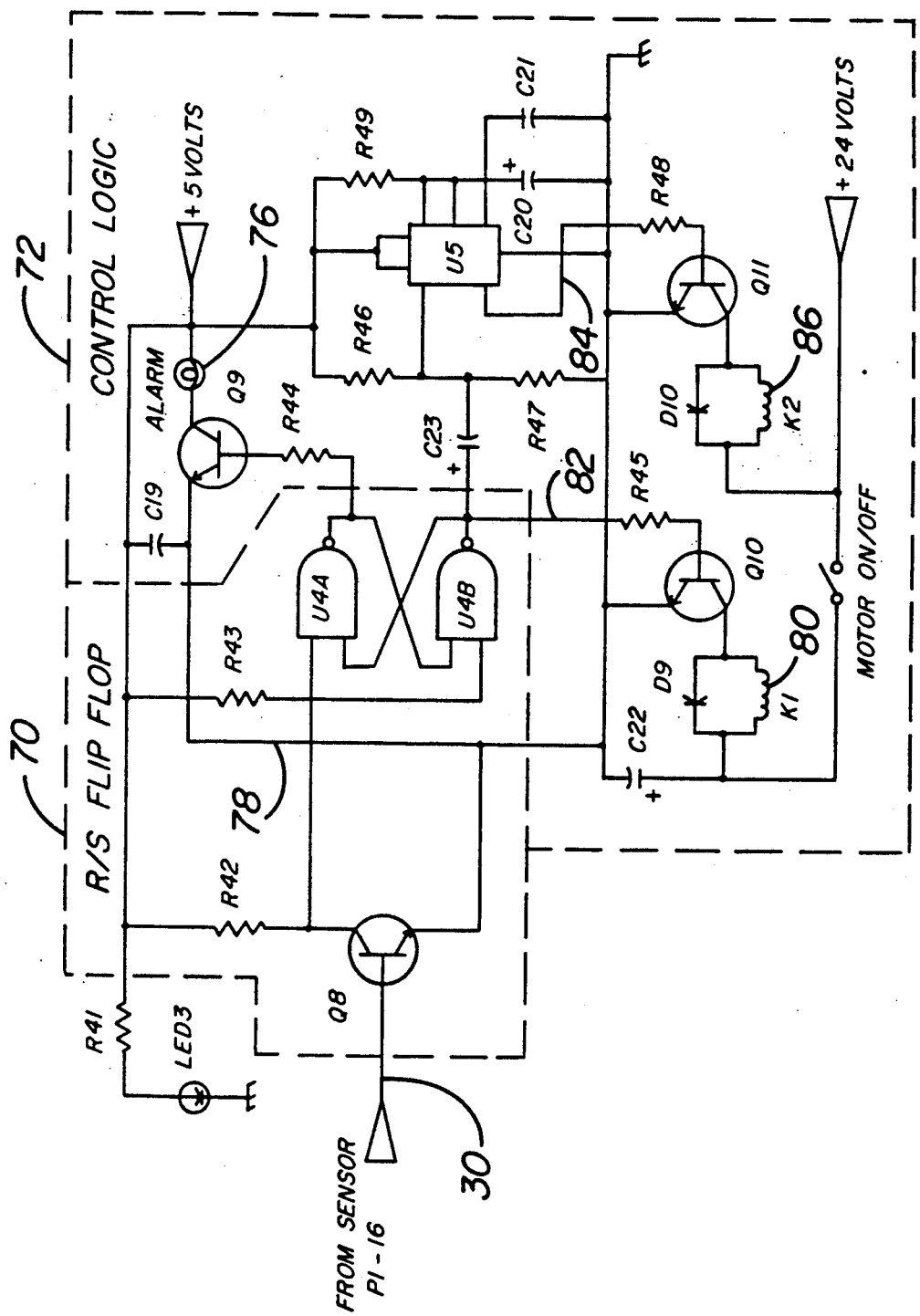
FIG. 6 is a schematic circuit diagram of the interlock controller which responds to output signal from the level detection electronics in FIG. 5 to initiate shut down operation for the power saw.

Referring now in sequence to FIGS. 4, 5, and 6, the conventional active and passive component notation is used in these three figures wherein resistors are identified R1, R2, R3, etc., capacitors are identified as C1, C2, C3, etc., inductors are identified as L1, L2, L3, etc., transistors are identified as Q1, Q2, Q3, etc., diodes are identified as D1, D2, D3, etc. Zener diodes are identified as Z1, Z2, etc. and standard off-the-shelf amplifiers are identified as U1, U2, U3, etc. In addition, passive component values for the circuits shown in FIGS. 4, 5, and 6 are listed in TABLE B below, and therefore it is not necessary for those skilled in the art to call out each and every circuit connection in FIGS. 4, 5, and 6 in detail. These circuits are connected exactly as shown in these figures. Instead, the discussion to follow will focus on the more significant functions of the various stages in these figures as they have a bearing on signal processing, signal modification, signal amplifying, signal filtering and other like functions which are all related to providing a detectable level of output signal at the output 30 of the level detector stage 28 in FIGS. 1 and 2 and useful for providing a break and motor control signal to the output break and motor control stage 32.

Returning again to FIG. 4, the oscillator and low pass filter stage 34 includes a 12 megahertz crystal controlled oscillator and transistor stage Q1 connected as shown to a tuned resonant tank circuit including inductor L1 and capacitors C2 and C3. The capacitors C2 and C3 serve as a voltage divider from which an output signal may be derived and applied to base of a buffer amplifier Q2. The output of the buffer amplifier Q2 is connected as shown to the input of a low pass filter stage 35 including the series and parallel connected passive components shown therein. The low pass filter network 35 consist of resistor R9, capacitor C8, inductor L2, and capacitor C5. Since the Pierce oscillator circuit including the transistor Q1 connected as shown is slightly overdriven during normal operation, the low pass filter network 35 serves to remove the harmonics from this signal so that the output signal provided on line 50 is a relatively clean sinewave signal.

The oscillator signal indicator stage 37 is not shown in the functional block diagrams in FIGS. 1 and 2 above and is used merely for the purpose of providing an operation indication at the light emitting diode (LED) 52 which is connected as shown to the output of the transistor Q3. The LED 52 merely gives an indication that the Pierce oscillator circuit in stage 34 is operating properly. Additionally, the LED 52 can be used in tuning the Pierce oscillator circuit of stage 34 including the tunable inductor L1, and the tunable capacitor C3 therein. This is done by varying the intensity of the output of the LED 52 in accordance with the resonant point of the tank circuit consisting of inductor L1 and capacitors C2 and C3.

The output driver stage 36 includes transistors Q4, Q5, and Q6 connected as shown in FIG. 4. The driver stage 36 is connected essentially as a wide band amplifier having a bandwidth of approximately 20 megahertz which may be controlled by varying the value of the inductor L3. The driver stage 36 thus provides a low impedance driving source for the sloped tuned network 10 in FIGS. 1 and 2. Since the impedance of the sloped tuned network 10 is dynamic, it is important that the low output impedance of the driver stage 36 remains substantially constant. This is accomplished using the push pull connection of transistors Q5 and Q6 connected as shown which are driven by the collector output of the input transistor Q4. The diodes D2 and D3 provide the necessary DC offsets within the driver stage 36 so as to minimize the distortion of the output signal appearing on line 56 and applied as an input signal to the sloped tuned network 10. The driver circuit 36 is further stabilized by the DC feedback connection including resistors R13 and R14 connected as shown between the diodes D2 and D3 and the input transistor Q4. The RF output signal on line 56 is typically about eight (8), volts peak, and this signal is applied to the input of the sloped tuned network 10.

Referring now to FIG. 5, the sloped tuned network 10 includes capacitor C10, inductor L4, and capacitor C11. The resistor R21 in FIG. 5 corresponds to the resistor identified as R, of 680 ohms, in FIG. 1; the capacitor C10 corresponds to capacitor $C_1$ in FIG. 1; the inductor L4 corresponds to the inductor identified as L in FIG. 1; and the variable capacitor C11 corresponds to the variable capacitor $C_3$ in FIG. 1. The sloped tuned network 10 further includes a varactor diode D6 which is connected to a variable potentiometer 58 to provide the necessary critical tuning of the network 10 in addition to that provided by the variable capacitor C11. The tuning of capacitor C11 is very critical to proper sloped tuned network operation.

The sloped tuned network 10 provides an input signal to the following stage 20 which is the envelope detector stage previously identified functionally in FIGS. 1 and 2 above. The envelope detector 20 includes a diode detector components consisting of D4 and R22 which develops the amplitude detected carrier signal which is applied to the low pass filter 40, and the low pass filter 40 serves to remove the carrier components of the rectified signal. As previously indicated, the low pass filter network 40 consisting of capacitor C12, inductor L5 and capacitor C13 and is a third order Butterworth filter which has a rolloff gain characteristic so that it is about 3 dB down at about 10 kilohertz and thus provides the desired level of input signal to the DC amplifier stage 42.

The signal applied to the DC amplifier stage 42 is coupled through resistor R24 to the operational amplifier U1 which is referenced to approximately 6 volts and provides a zero volt output signal on line 60 when the sloped tuned network 10 is properly tuned to resonance. The output voltage on line 58 from the DC amplifier stage 42 is then applied to the meter amplifier and meter stage 43 including a voltage follower amplifier U1A, which is a unity gain voltage follower amplifier connected as shown to apply signals to a meter 62. The diodes D6, D7 and D8 connected as shown across the meter 62 are for the purpose of protecting the meter 62 from over-voltage when the system starts up. The input signal to the meter amplifier and meter stage 43 is taken from a tunable potentiometer 2 which is used to control the trigger point for the DC amplifier stage 42 and thereby cause triggering to occur, for example, at about a 12 inch separation distance between a human hand or other body part and the sawblade, and down to a much closer separation distance if desired in the range of three to four inches.

The DC amplifier stage 42, which has about 20 dB of gain, feeds its output signal by way of line 64 to the voltage amplifier stage 44. The voltage amplifier stage 44 has a clamping diode D5 connected as shown therein to capacitor C16 and is used for the purpose of stabilizing the voltage across the capacitor C16 when inanimate objects are moved rapidly into an out of the field of the antenna 16 and would thus otherwise tend to cause the capacitor C16 to be driven negatively quite rapidly and thus de-stabilize the voltage amplifier stage 44. If the output signal on line 64 goes negative, then the voltage across capacitor C16 will tend to track this negative going signal, so that when inanimate objects are moved rapidly into and out of the field of the antenna 16 and might otherwise cause undesirable voltage swings across capacitor C16, the clamping diode D5 will clamp this voltage level at a desirable and stable point.

The output signal from the voltage amplifier 44 is connected by way of line 66 and resistor R38 to the positive input terminal of the operational amplifier U3, which is a standard National Semiconductor LM311 type operational amplifier. This amplifier U3 is referenced at its negative terminal to a DC voltage such that the amplifier U3 will trigger on an output signal on line 66 in the range of 2 to 3 volts and thereby generate an output signal on line 68 which is then applied to both the alarm indicator stage 33 and by way of previously identified line 30 to the break and motor control circuitry and electronics 32 previously identified, and including the interlock controller stage shown in FIG. 6.

Referring now to the interlock controller stage shown in FIG. 6, this circuitry consists of an RS flip-flop stage 70 connected to drive brake and motor control logic circuitry 72. The input level detected signal on line 30 is applied as shown to an input transistor Q8 in the RS flip-flop stage 70, and the toggle action of this flip-flop stage 70 is provided by the cross coupled amplifiers U4A and U4B as shown. The transistor Q8 is a logic inverter whose collector output signal is applied to one input of the amplifier U4A. When the RS flip-flop comprising amplifiers U4A and U4B toggles to provide a switching signal on the output conductor 74, the transistor Q9 is switched to conduction to energize the alarm 76 and also to generate an output motor shut down signal on line 78. This signal is applied to the motor relay coil 80 to turn off the motor (not shown) which drives the sawblade 18. Simultaneously, an output signal on line 82 is applied to transistor Q10 and is further coupled through capacitor C23 to the integrated circuit NE555 type timer identified as U5. When the U5 timer is activated, a signal on its output conductor 84 is applied to the base of transistor Q11 to in turn activate the motor brake relay coil 86, thereby activating the brake relay 86 for the time out period of the timer U5.

TABLE B

Listed herein are the passive component values for the circuits shown in FIGS. 4, 5, and 6 described above, but these values are given by way of illustration only and impose no limitation on the scope of the appended claims. A resistor is designated by "R", capacitor by "C", and inductor by "L".

| Component | Value |
| --- | --- |
| R1 | 27K Ω |
| R2 | 3.3K Ω |
| R3 | 47 Ω |
| R4 | 220 Ω |
| R5 | 10K Ω |
| R6 | 100 Ω |
| R7 | 390 Ω |
| R8 | 1000 Ω |
| R9 | 68 Ω |
| R10 | 100K Ω |
| R11 | 1200 Ω |
| R12 | 820 Ω |
| R13 | 24K Ω |
| R14 | 4.7K Ω |
| R15 | 5.6K Ω |
| R16 | 200 Ω |
| R17 | 180 Ω |
| R18 | 1500 Ω |
| R19 | 10 Ω |
| R20 | 10 Ω |
| R21 | 680 Ω |
| R22 | 100K Ω |
| R23 | 1200 Ω |
| R24 | 10K Ω |
| R25 | 10K Ω |
| R26 | 100K Ω |
| R27 | 100K Ω |
| R28 | 5K Ω |
| R29 | 1000 Ω |
| R30 | 100K Ω |
| R31 | 1000 Ω |
| R32 | 16K Ω |
| R33 | 56K Ω |
| R34 | 10K Ω |
| R35 | 1000 Ω |
| R36 | 22K Ω |
| R37 | 7K Ω |
| R38 | 4.7K Ω |
| R39 | 820 Ω |
| R41 | 220 Ω |

TABLE B-continued

Listed herein are the passive component values for the circuits shown in FIGS. 4, 5, and 6 described above, but these values are given by way of illustration only and impose no limitation on the scope of the appended claims. A resistor is designated by "R", capacitor by "C", and inductor by "L".

| Component | Value |
| --- | --- |
| R42 | 2200 Ω |
| R43 | 2200 Ω |
| R44 | 1000 Ω |
| R45 | 1000 Ω |
| R46 | 4.7K Ω |
| R47 | 6.8K Ω |
| R48 | 1000 Ω |
| R49 | 91K Ω |
| C1 | 150 pF |
| C2 | 150 pF |
| C3 | 10–40 pF |
| C4 | .01 μF |
| C5 | 82 pF |
| C6 | .01 μF |
| C7 | .01 μF |
| C8 | .01 μF |
| C9 | .01 μF |
| C10 | 36 pF |
| C11 | 4–20 pF |
| C12 | .012 μF |
| C13 | .033 μF |
| C15 | .001 uF |
| C16 | 220 μF |
| C17 | 10 μF |
| C18 | 47 μF |
| C19 | 47 μF |
| C20 | 10 μF |
| C21 | .01 μF |
| C22 | 47 μF |
| C23 | 5 μF |
| L1 | 7–14 μH |
| L2 | 10 μH |
| L3 | 10 μH |
| L4 | 3–5 μH |
| L5 | 15 mH |

Various modifications may be made in and to the above described embodiment without departing from the spirit and scope of this invention. For example, the various electrical values given above may be varied in accordance with a particular equipment control application, and the operational power and threshold levels and antenna size, shape and connection may also be changed and modified where the operating distance between the operator and equipment under control is increased or decreased. Thus, if for example the system described above were to be adapted for the opening of doors in response to a person approaching a door, the antenna field would have to be greatly increased in order for the RLC circuit 10 to properly respond to a person coming within, for example, three to six feet of the door.

In addition, the present invention may be used in combination with and control for other systems such as those used in meat chopping, metal buffing, and other heavy duty construction applications by the judicious selection of component values and tuning in accordance with the teachings provided herein. Also, as previously indicated, if the above described system is to be adapted for use with control systems for controlling equipment located twenty to thirty feet or more from an approaching human being, then the output power from the RF source 12 must be increased substantially and the effective "parallel plate" area of coupling to the antenna 16 must also be increased substantially. In addition, materials selection for parallel plate antenna materials will become important in these types of long range dynamic capacitance operations, and it may in some instances be desirable to use a plurality of directionally oriented antennas to give varying sensitivities to persons entering, say, from angular or side directions to an apparatus being controlled as opposed to a person entering head-on through a capacitance sensitive door or the like.

Accordingly, the above circuit, system and method variations which are within the skill of this art are clearly within the scope of my following appended claims.

We claim:

1. A system for controlling the motion of a potentially dangerous or other moving part which comprises means for tuning a filter circuit at or near a point of resonance in response to body capacitance generated when a person comes within a predetermined critical distance from said moving part, said filter circuit comprising a bandpass filter (BPF) network being operatively tunable below its point of resonance and connected to an antenna having a lumped capacitance which is operative to resonate with said bandpass filter network and control the transfer gain thereof, said antenna being further operative to add human body capacitance to said lumped capacitance and cause said BPF network to move towards its point of resonance, increase said transfer gain, and generate a detectable output signal which varies in amplitude in response to body capacitance dynamic changes in the capacitance dynamically coupled to said antenna whereby signals processed from the output of said filter circuit are utilized to stop, start or otherwise control the motion of said moving part.

2. A system for stopping the motion of a potentially dangerous or other moving or movable part substantially instantaneously which comprises:
    a. a tunable circuit which is connected to an antenna in proximity to said moving part, said tunable circuit comprising a bandpass filter (BPF) network being operatively tunable below its point of resonance and connected to said antenna having a lumped capacitance which is operative to resonate with said bandpass filter network and control the transfer gain thereof, said antenna being further operative to add human body capacitance to said lumped capacitance and cause said BPF network to move towards its point of resonance, increase said transfer gain, and generate a detectable output signal which varies in amplitude in response to body capacitance dynamic changes in the human body capacitance dynamically coupled to said antenna, and
    b. means connected to said tunable circuit for detecting said tunable circuit at or near said point of resonance when a person comes within a predetermined critical distance of said moving part, whereby an output signal from said tunable circuit operating at or near said point of resonance is processed to control the motion and stopping of said moving part.

3. A proximity sensing system for controlling the motion of a moving or movable part which comprises in combination:
    a. an antenna for said moving or movable part,
    b. means for coupling a bandpass tunable filter circuit to said antenna so that said antenna provides a lumped capacitance for said tunable filter circuit which is variable in response to body or human capacitance produced when a person comes within close proximity to said antenna,
    c. means connected to said tunable filter circuit for applying an RF signal thereto,
    d. means for detecting tunable filter circuit at a point at or near a resonant condition in response to a variation in said lumped capacitance produced by said person coming within a predetermined critical distance from said antenna, said tunable filter circuit comprising a bandpass filter (BPF) network being operatively tunable below its point of resonance and connected to said antenna having said lumped capacitance which is operative to resonate with said bandpass filter network and control the transfer gain thereof, said antenna being further operative to add the human body capacitance to said lumped capacitance and cause said BPF network to move towards its point of resonance, increase said transfer gain, and generate a detectable output signal which varies in amplitude in response to body capacitance dynamic changes in the human body capacitance dynamically coupled to said antenna, whereby the tuning of said tunable filter circuit to a point near resonance condition allows a detectable level of said RF signal to pass therethrough and then be detected and processed to activate safety equipment for controlling or stopping the motion of said moving or movable part substantially instantaneously.

4. The system defined in claim 3 which further includes output means connected to said tunable filter circuit for stopping the motion of said moving or movable part substantially instantaneously.

5. The system defined in claim 4 wherein said output means connected to said tunable filter circuit includes:
    a. envelope detection means connected to said tunable filter circuit for receiving a carrier modulated signal therefrom and providing an output signal comprising modulation components of said carrier modulated signal,
    b. signal processing means connected to said envelope detection means for amplifying said modulation components received from said envelope detection means, and
    c. level detection means connected to said signal processing means for providing an output brake and control signal when the level of output signals from said signal processing means reaches a predetermined value.

6. The system defined in claim 5 wherein said tunable filter circuit is connected to said antenna by way of a coaxial cable.

7. The system defined in claim 3 wherein said tunable filter circuit is a resistance-inductance-capacitance (RLC) filter circuit including an input resistor connected to receive said RF signal, and a series inductor connected between two parallel connected capacitors in a band pass filter arrangement, whereby one of said capacitors is made variable for tuning purposes and connected to said antenna by way of a coaxial cable which in turn serves to couple said human body capacitance to said band pass filter arrangement and thereby tune said band pass filter arrangement at or near its point of resonance.

8. The system defined in claim 7 which further includes output circuit means connected to said band pass filter arrangement and comprises:

a. envelope detection means connected to said tunable filter circuit for receiving a carrier modulated signal therefrom and providing an output signal comprising modulation components of said carrier modulated signal,
b. signal processing means connected to said envelope detection means for amplifying said modulation components received from said envelope detection means, and
c. level detection means connected to said signal processing means for providing an output brake and control signal when the level of output signals from said signal processing means reaches a predetermined value.

* * * * *